United States Patent
Shin (10) Patent No.: US 8,450,006 B2
(45) Date of Patent: May 28, 2013

(54) RECHARGEABLE BATTERY

(75) Inventor: Hosik Shin, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 134 days.

(21) Appl. No.: 12/805,795

(22) Filed: Aug. 19, 2010

(65) Prior Publication Data

US 2011/0076547 A1    Mar. 31, 2011

(30) Foreign Application Priority Data

Sep. 30, 2009  (KR) .................. 10-2009-0093342

(51) Int. Cl.
*H01M 10/04* (2006.01)
*H11M 6/00* (2006.01)

(52) U.S. Cl.
USPC ........... 429/161; 429/209; 429/159; 429/178; 429/164

(58) Field of Classification Search
USPC ............... 429/161, 178, 181, 164, 209–213, 429/149, 158, 159
See application file for complete search history.

(56) References Cited

U.S. PATENT DOCUMENTS

| | | | |
|---|---|---|---|
| 7,214,250 B2 * | 5/2007 | Yashiro et al. | 29/623.4 |
| 7,364,817 B2 * | 4/2008 | Lee | 429/161 |
| 7,807,292 B2 * | 10/2010 | Takagi et al. | 429/161 |
| 2003/0129479 A1 | 7/2003 | Munenaga et al. | |
| 2006/0051664 A1 * | 3/2006 | Tasai et al. | 429/161 |
| 2007/0160904 A1 * | 7/2007 | Uh | 429/174 |
| 2011/0244308 A1 * | 10/2011 | Byun et al. | 429/158 |
| 2011/0294001 A1 * | 12/2011 | Byun et al. | 429/181 |
| 2011/0311861 A1 * | 12/2011 | Baek et al. | 429/178 |
| 2012/0015244 A1 * | 1/2012 | Kim et al. | 429/209 |
| 2012/0021277 A1 * | 1/2012 | Byun et al. | 429/178 |
| 2012/0055147 A1 * | 3/2012 | Fong et al. | 60/329 |
| 2012/0088137 A1 * | 4/2012 | Nakura | 429/94 |
| 2012/0094169 A1 * | 4/2012 | Kim et al. | 429/164 |
| 2012/0135283 A1 * | 5/2012 | Lee | 429/82 |
| 2012/0171555 A1 * | 7/2012 | Heo et al. | 429/161 |
| 2012/0177982 A1 * | 7/2012 | Byun | 429/163 |

FOREIGN PATENT DOCUMENTS

| | | |
|---|---|---|
| EP | 1 059 680 A1 | 12/2000 |
| JP | 2002-324568 A | 11/2002 |
| JP | 2002-346770 A | 12/2002 |

(Continued)

OTHER PUBLICATIONS

Korean Office action dated Jun. 30, 2011 issued in priority application KR 10-2009-0093342.
Chinese Office action dated Jan. 10, 2013 for CN 201010295528.8 (Hosik Shin).

(Continued)

*Primary Examiner* — Joseph S Del Sole
*Assistant Examiner* — Nahida Sultana
(74) *Attorney, Agent, or Firm* — Lee & Morse, P.C.

(57) ABSTRACT

A secondary battery includes a plurality of electrode assemblies disposed in a same direction, each electrode assembly of the plurality of electrode assemblies including a first electrode plate with a first electrode non-coating portion, a second electrode plate with a second electrode non-coating portion, and a separator between the first electrode plate and the second electrode plate, a first collector plate contacting the first electrode non-coating portions of the plurality of electrode assemblies, the first collector plate electrically connecting the first electrode non-coating portions to each other in a parallel connection, and a case configured to contain the plurality of electrode assemblies and the first collector plate.

18 Claims, 9 Drawing Sheets

FOREIGN PATENT DOCUMENTS

| | | |
|---|---|---|
| JP | 2006-222087 A | 8/2006 |
| KR | 10 2005-0015922 A | 2/2005 |
| KR | 10 2006-0009411 A | 1/2006 |
| KR | 10 2008-0010738 A | 1/2008 |

OTHER PUBLICATIONS

Japanese Notice of Allowance dated Jan. 15, 2013 for JP 2010-139183 (Shin).

* cited by examiner

RECHARGEABLE BATTERY

BACKGROUND

1. Field

Embodiments relate to a rechargeable secondary battery.

2. Description of the Related Art

Secondary batteries are rechargeable batteries that can be charged and discharged. Generally, such a secondary battery is realized as a small-capacity secondary battery including one electrode assembly. The small-capacity secondary battery is applicable to portable small-sized electric devices, e.g., a portable terminal and a camcorder.

In recent years, secondary batteries have been also realized as large capacity secondary batteries to be applied to power sources, e.g., for driving motors in electric tools and hybrid vehicles. However, the conventional secondary batteries with large capacity may require changes in manufacturing equipment and process for realizing the existing small-capacity secondary battery into manufacturing equipment and process for realizing the large-capacity secondary battery. Such changes in manufacturing equipment and process may be complicated and costly.

SUMMARY

Embodiments are therefore directed to a rechargeable battery, which substantially overcomes one or more of the problems due to the limitations and disadvantages of the related art.

It is therefore a feature of an embodiment to provide a rechargeable secondary battery structure that realizes a large-capacity secondary battery using manufacturing equipment for a small-capacity second battery.

It is another feature of an embodiment to provide a rechargeable secondary battery structure with improved safety.

At least one of the above and other features and advantages may be realized by providing a secondary battery, including a first electrode plate having a first electrode non-coating portion, a second electrode plate having a second electrode non-coating portion, and a separator disposed between the first electrode plate and the second electrode plate, the plurality of electrode assemblies being disposed in one direction, a first collector plate contacting the first electrode non-coating portions of the plurality of electrode assemblies, the first collector plate electrically connecting the first electrode non-coating portions to each other in a parallel connection, and a case receiving the plurality of electrode assemblies and the first collector plate.

The first electrode non-coating portions may protrude to one side of the plurality of electrode assemblies, and the second electrode non-coating portions may protrude to the other side of the plurality of electrode assemblies.

The electrode assemblies may be disposed adjacent to each other.

The first collector plate may include a plate integrally connecting the first electrode non-coating portions to each other.

The first collector plate may have a strip shape.

The first collector plate may include a first plate integrally connecting the first electrode non-coating portions to each other, and a second plate cross-connected to the first plate, the second plate contacting the respective first electrode non-coating portions.

The first plate and the second plate may be cross-connected to each other to form a cross shape.

The first collector plate may include a first welding portion protruding toward the plurality of electrode assemblies, the first welding portion being welded to the first electrode non-coating portions.

The first collector plate may include a first base having a plate facing the first electrode non-coating portions of the plurality of electrode assemblies, and a first sidewall extending from an end of the first base toward the plurality of electrode assemblies to surround the first electrode non-coating portions of the plurality of electrode assemblies, wherein the first welding portion is disposed in the first base.

The first welding portion may include a first protrusion contacting the first electrode non-coating portions of the plurality of electrode assemblies to integrally connect the first electrode non-coating portions of the plurality of electrode assemblies to each other, and a second protrusion cross-connected to the first protrusion, the second protrusion contacting the respective first electrode non-coating portions.

The plurality of electrode assemblies may include a receiving portion disposed in a groove shape in a region corresponding to the first welding portion of the first electrode non-coating portions.

The secondary battery may further include a cap assembly sealing the case.

The cap assembly may include a first electrode terminal exposed to the outside of the cap assembly in a region facing the first collector plate, the first electrode terminal being welded to the first collector plate.

The second electrode non-coating portions of the plurality of electrode assemblies may be welded to the case.

The first electrode plate, the separator, and the second electrode plate may be wound to form the electrode assembly.

The electrode assembly may have a cylindrical or prismatic shape.

The secondary battery may further include a second collector plate contacting the second electrode non-coating portions of the plurality of electrode assemblies, the second collector plate electrically parallelly connecting the second electrode non-coating portions to each other.

The secondary battery may further include a second electrode terminal passing through the case facing the second collector plate, the second electrode terminal being welded to the second collector plate.

The first electrode terminal may be disposed in a central region of the first collector plate, and the second electrode terminal may be disposed in a central region of the second collector plate, wherein the first electrode terminal and the second electrode terminal may be collinearly disposed in a direction perpendicular to an arrangement direction of the plurality of electrode assemblies.

The first electrode terminal may be disposed at a side of the first collector plate, and the second electrode terminal may be disposed at a side of the second collector plate, wherein the first electrode terminal and the second electrode terminal may be symmetrically disposed about a center of the plurality of electrode assemblies in the arrangement direction of the plurality of electrode assemblies.

At least one of the above and other features and advantages may be realized by providing a secondary battery, including a plurality of electrode assemblies including first electrode non-coating portions protruding toward one side and second electrode non-coating portions protruding toward the other side, the plurality of electrode assemblies being disposed in one direction, a first collector plate contacting the first electrode non-coating portions of the plurality of electrode assemblies, the first collector plate electrically connecting the first electrode non-coating portions to each other in a parallel connection, and a case receiving the first collector plate and the plurality of electrode assemblies, wherein the first collector plate is directly welded to the first electrode non-coating portions.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0093342, filed on Sep. 30, 2009, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1A:
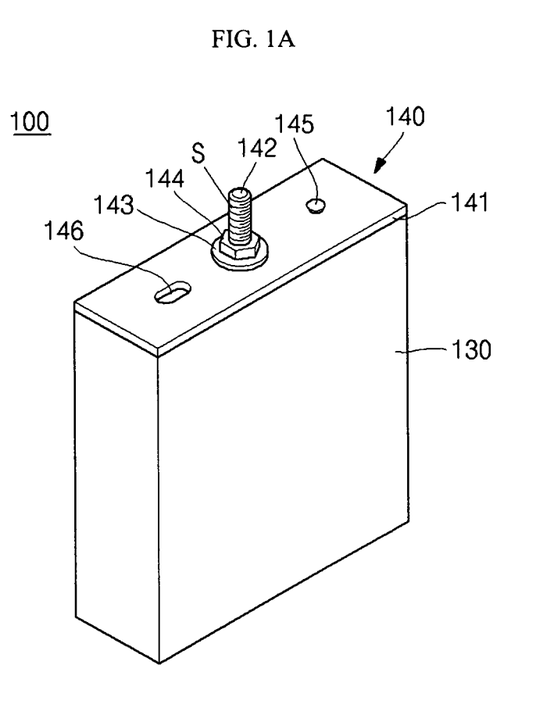
FIG. 1A illustrates a perspective view of a secondary battery according to an embodiment.
Figure 1B:
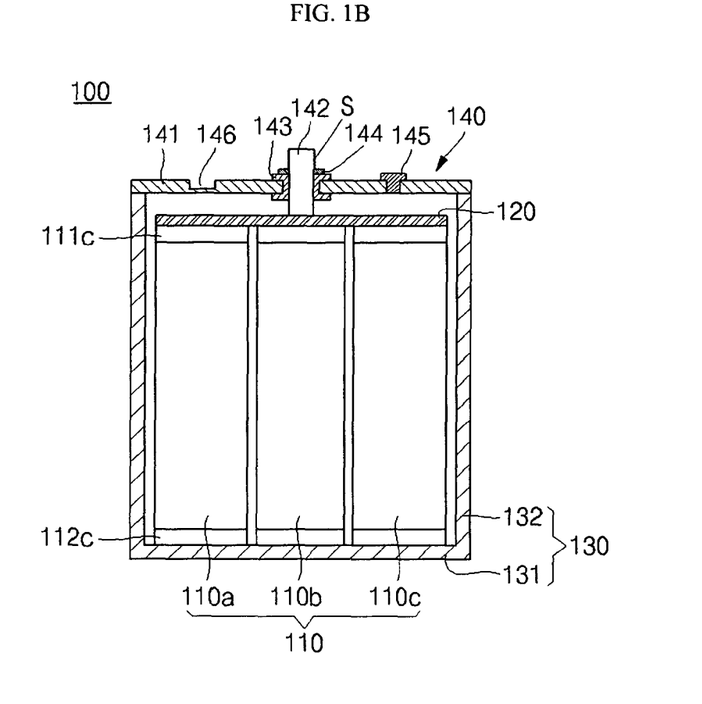
FIG. 1B illustrates a cross-sectional view of the secondary battery of FIG. 1A.
Figure 1C:
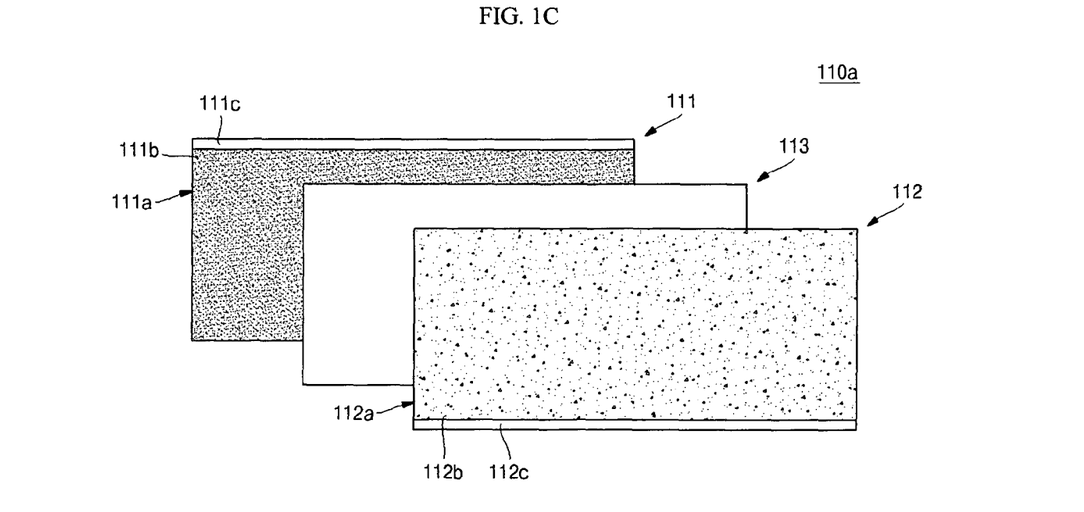
FIG. 1C illustrates a perspective exploded view of an electrode assembly before being wound in the secondary battery of FIG. 1B.
Figure 1D:
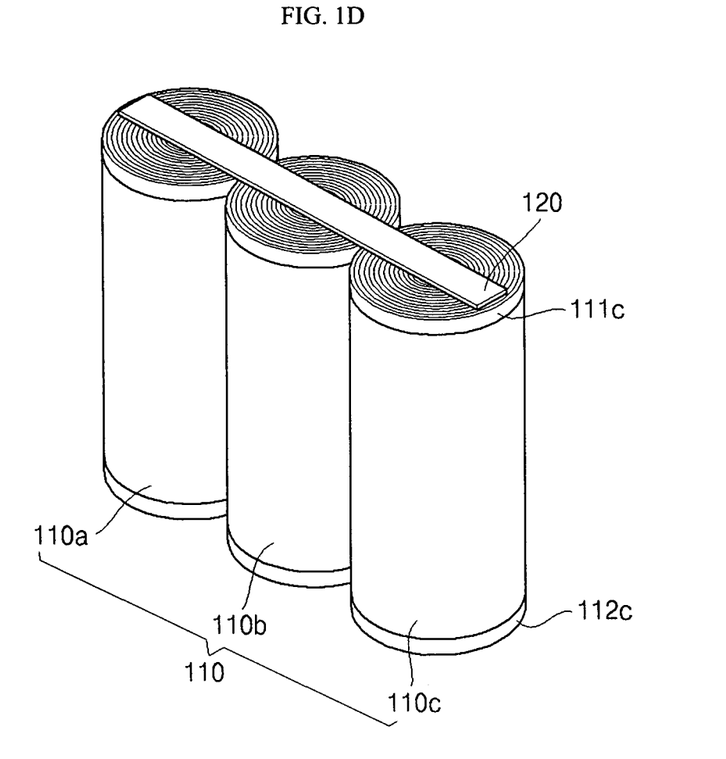
FIG. 1D illustrates a perspective view of a first collector plate coupled to a plurality of electrode assemblies in the secondary battery of FIG. 1B.
Figure 2:
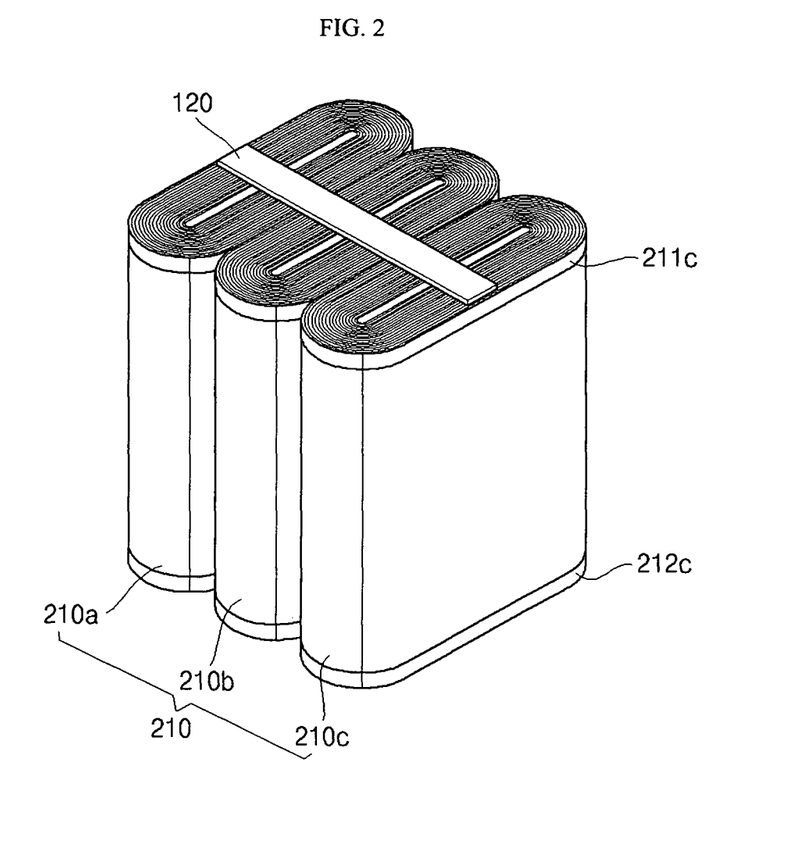
FIG. 2 illustrates a perspective view of a first collector plate coupled to a plurality of prismatic electrode assemblies in a secondary battery according to another embodiment.

FIG. 1A illustrates a perspective view of a secondary battery according to an embodiment, and FIG. 1B illustrates a cross-sectional view of the secondary battery of FIG. 1A. FIG. 1C illustrates a perspective view of a state in which an electrode assembly is stacked before it is wound in the secondary battery of FIG. 1B, and FIG. 1D illustrates a perspective view of a state in which a first collector plate is coupled to a plurality of electrode assemblies in the secondary battery of FIG. 1B. FIG. 2 illustrates a perspective view of a state in which the first collector plate of FIG. 1D is coupled to a plurality of prismatic electrode assemblies.

Referring to FIGS. 1A to 1D, a secondary battery 100 according to an embodiment may include a plurality of electrode assemblies 110, a first collector plate 120, a case 130, and a cap assembly 140.

The plurality of electrode assemblies 110 may include small-capacity electrode assemblies. The electrode assemblies 110 may be divided into a first electrode assembly 110a, a second electrode assembly 110b, and a third electrode assembly 110c. Here, the plurality of electrode assemblies 110 may include three electrode assemblies 110a, 110b, and 110c, but is not limited thereto. For example, the plurality of electrode assemblies 110 may include three or more electrode assemblies. The small capacity may be defined as a capacity of a secondary battery that is applicable to portable small-sized electric devices, e.g., a portable terminal or a camcorder, while a large capacity may be defined as a capacity of a secondary battery that is applicable to a power source for driving a motor in electric tools and hybrid vehicles.

With respect to the plurality, of electrode assemblies 110, the first electrode assembly 110a will be described in detail as an example. Referring to FIG. 1C, a first electrode plate 111, a separator 113, and a second electrode plate 112, which have thin plate or film shapes, may be stacked and wound to form the first electrode assembly 110a. The first electrode plate 111 and the second electrode plate 112 may have respective polarities different from each other. For example, the first electrode plate 111 may be a negative electrode, and the second electrode plate 112 may be a positive electrode.

The first electrode plate 111 may include a first electrode collector 111a and a first electrode coating portion 111b coated on both surfaces of the first electrode collector 111a. Furthermore, a first electrode non-coating portion 111c, on which a first electrode active material is not coated, may be disposed on the first electrode collector 111a.

The first electrode collector 111a may have a foil shape for collecting current, and may be formed of, e.g., nickel (Ni) or copper (Cu). The first electrode coating portion 111b may generate electricity, and may be formed of, e.g., graphite or carbon. The first electrode non-coating portion 111c may be disposed at a side, e.g., a terminal edge, of the first electrode collector 111a to provide a current flow path between the first electrode plate 111 and the outside.

The second electrode plate 112 may include a second electrode collector 112a and a second electrode coating portion 112b coated on both surfaces of the second electrode collector 112a. Furthermore, a second electrode non-coating portion 112c, on which a second electrode active material is not coated, may be disposed on the second electrode collector 112a.

The second electrode collector 112a may have a foil shape for collecting current, and may be formed of, e.g., aluminum (Al). The second electrode coating portion 112b may generate electricity, and may be formed of a transition metal oxide, e.g., $LiCoO_2$, $LiNiO_2$, $LiMn_2O_4$, etc. The second electrode non-coating portion 112c may be disposed at a side, e.g., a terminal edge, of the second electrode collector 112a to provide a current flow path between the second electrode plate 112 and the outside.

The separator 113 may be disposed between the first electrode plate 111 and the second electrode plate 112 to prevent the first electrode plate 111 and the second electrode plate 112 from being short-circuited. Also, the separator 113 may allow only lithium ions to be moved. The separator 113 may include, e.g., a polyethylene film, a polypropylene film, a composite film of polyethylene and polypropylene, etc.

In the first electrode assembly 110a, the first electrode plate 111, the separator 113, and the second electrode plate 112 may be disposed and wound, such that the first electrode non-coating portion 111c and the second electrode non-coating portion 112c protrude to the outside from opposite sides of the first electrode assembly 110a. For example, as illustrated in FIG. 1B, the first electrode non-coating portion 111c may protrude toward a top of the first electrode assembly 110a, and the second electrode non-coating portion 112c may protrude toward a bottom, i.e., an opposite side with respect to the top, of the first electrode assembly 110a.

The first electrode plate 111, the separator 113, and the second electrode plate 112 may be spirally wound, e.g., to have a cross-section of a vortex as view from a plan view, or stacked to form the first electrode assembly 110a. For example, the first electrode assembly 110a may be cylindrically wound, e.g., the electrode plates 111/112 and separator 113 may be wound to define a plurality of concentric cylinders with gradually increasing diameters. The second electrode assembly 110b and the third electrode assembly 110c may have the same configuration and manufacturing method as the first electrode assembly 110a and, therefore, their descriptions will not be repeated.

Referring to FIG. 1D, the first electrode assembly 110a, the second electrode assembly 110b, and the third electrode assembly 110c may be disposed in one direction, i.e., parallel to each other. The first through third electrode assemblies 110a through 110c may be adjacent to each other, and may be fixed as one body by a fixing tape (not shown). For example, the first through third electrode assemblies 110a through 110c may be aligned, so top surfaces, i.e., surfaces substantially parallel to a bottom 131 of the case 130 and including terminal edges of the first electrode non-coating portions 111c, of the first through third electrodes assemblies 110a through 110c may be substantially coplanar. For example, the top surfaces of the first through third electrode assemblies 110a through 110c may be aligned to have diameters of planar cross-sections of the top surfaces aligned.

As illustrated in FIG. 1B, the plurality of electrode assemblies 110 disposed in the one direction may have a first side thereof, i.e., the top surface, coupled to the first collector plate 120, e.g., the first electrode non-coating portions 111c of the first electrode plates 111 of the plurality of electrode assemblies 110 may be electrically connected to each other via the first collector plate 120. As further illustrated in FIG. 1B, the other side of the electrode assemblies 110, i.e., second side opposite the first side, may be contacted with the case 130 to have an opposite polarity with respect to the first collector plate 120 and to electrically connect the second electrode plates 112 of the electrode assemblies 110.

Referring to FIG. 1D, the first collector plate 120 may be formed of a conductive material, and may contact the first electrode non-coating portions 111c protruding from the plurality of electrode assemblies 110. For example, the first collector plate 120 may be a linear member positioned to overlap the top surfaces of the first through third electrode assemblies 110a through 110c, e.g., the first collector plate 120 may be aligned with diameters of the top surfaces. Therefore, the first collector plate 120 may electrically connect the first electrode non-coating portions 111c of the plurality of electrode assemblies 110 to each other in a parallel connection. As illustrated in FIG. 1B, the first collector plate 120 may be electrically connected to the first electrode plate 111 and to a first electrode terminal 142, thereby providing a current flow path between the plurality of electrode assemblies 110 and an external electric device.

Particularly, the first collector plate 120 may include a long strip-shaped plate to integrally connect the first electrode non-coating portions 111c of the plurality of electrode assemblies 110 disposed in the one direction to each other. For example, the first collector plate 120 may be directly welded to the first electrode non-coating portion 111c of the plurality of electrode assemblies 110 using a welding process. The first collector plate 120 may be electrically connected to the first electrode non-coating portions 111c of the plurality of electrode assemblies 110 including the first electrode assembly 110a, the second electrode assembly 110b, and the third electrode assembly 110c, which have cylindrical shapes in FIG. 1D, but is not limited thereto. For example, as illustrated in FIG. 2, the first collector plate 120 may be electrically connected to first electrode non-coating portions 211c of a plurality of electrode assemblies 210 including a first electrode assembly 210a, a second electrode assembly 210b, and a third electrode assembly 210c, which have prismatic shapes.

The case 130 may include a bottom portion 131 for receiving an electrolyte (not shown), the plurality of electrode assemblies 110, the first collector plate 120, and a sidewall 132 extending from the bottom portion 131. The case 130 may have an open upper portion through which the plurality of electrode assemblies 110 and the first collector plate 120 may be inserted into the case 130. The case 130 may be formed of a conductive material, e.g., aluminum, an aluminum alloy, steel coated with nickel, etc., and may serve as an electrode having one polarity. In this embodiment, the second electrode non-coating portion 112c of the plurality of electrode assemblies 110 may contact the bottom portion 131 of the case 130 and may be welded by a welding process. As a result, the case 130 may be electrically connected to the second electrode non-coating portions 112c to serve as a second collector plate. Thus, an inner surface of the sidewall 132 may be treated to insulate the sidewall 132 from the first electrode non-coating portions 111c and the first collector plate 120 having a polarity different from the case 130.

The cap assembly 140 may include a cap plate 141, the first electrode terminal 142, a first gasket 143, and a first nut 144. The cap plate 141 may seal the case 130. The first electrode terminal 142 may pass through the cap plate 141 and may be connected to the first collector plate 120. The first gasket 143 may be disposed between the first electrode terminal 142 and the cap plate 141 to insulate the first electrode terminal 142 from the cap plate 141. The first nut 144 may be coupled along a screw thread S disposed on the first electrode terminal 142 to fix the first electrode terminal 142 to the cap plate 141. For example, the first electrode terminal 142 may be exposed to the outside of the cap assembly 140 and may be disposed in a central region of the cap plate 141. Also, an inner surface of the cap plate 141 may be insulated to prevent it from being unnecessarily electrically short-circuited.

Also, the cap assembly 140 may include a plug 145 sealing an electrolyte injecting hole (not shown) after electrolyte is injected through the electrolyte injecting hole formed in the cap plate 141. The cap assembly 140 may further include a safety vent 146 having a thin thickness and configured to break at a set pressure to exhaust gas.

The plurality of electrode assemblies 110 may be inserted into the case 130 through the open upper portion of the case 130. The electrolyte may be injected into the case 130, and the cap assembly 140 may cover and seal the open upper portion of the case 130 to complete the secondary battery.

As described above, the secondary battery 100 according to an embodiment may include the plurality of small-capacity electrode assemblies 110 and the first collector plate 120 electrically connecting the electrode assemblies 110 to each other. Therefore, manufacturing equipment for an existing small-capacity secondary battery may be maintained as it is to realize the large-capacity secondary battery. As a result, in the secondary battery 100 according to an embodiment, changes of equipment and process for manufacturing small-capacity secondary batteries into equipment and process for manufacturing large-capacity secondary batteries, e.g., a battery including a single electrode assembly having a large capacity, may not be necessary. Thus, in the secondary battery 100 according to an embodiment, it may be possible to improve and reduce the completed process and costs due to elimination of a necessity to change the manufacturing equipment and process.

In addition, in the secondary battery 100 according to an embodiment, when an external force is applied to the plurality of small-capacity electrode assemblies, only one electrode assembly may be damaged. Thus, an amount of generated heat may decrease, as compared to heat generated when an external force is applied to one large-capacity electrode assembly. Therefore, in the secondary battery 100 according to an embodiment, an explosion possibility may be reduced, and the safety may be improved.

Figure 3:
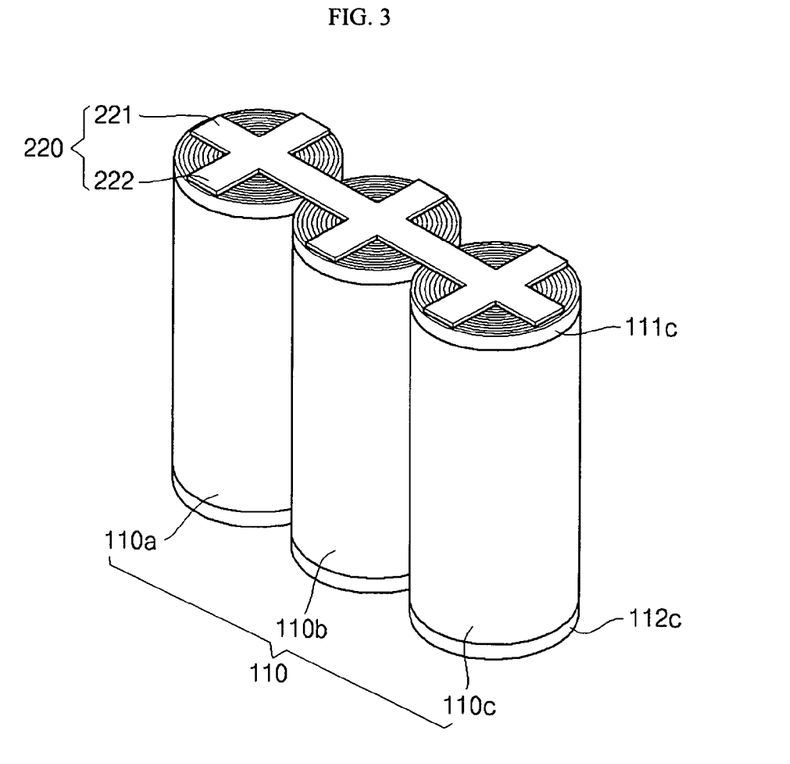
FIG. 3 illustrates a perspective view of a first collector plate coupled to a plurality of electrode assemblies in a secondary battery according to another embodiment.

A secondary battery according to another embodiment will be described below with reference to FIG. 3. FIG. 3 illustrates a perspective view of a state in which a first collector plate is coupled to a plurality of electrode assemblies in a secondary battery according to another embodiment. The secondary battery according to another embodiment may have the same configuration and operation as the secondary battery 100 discussed previously with reference to FIGS. 1A-1D, with the exception of a first collector plate 220. Thus, duplicate descriptions will not be repeated.

Referring to FIG. 3, the first collector plate 220 may include a first plate 221 and a second plate 222. For example, the first and second plates 221 and 222 may be formed integrally with each other.

The first plate 221 may contact first electrode non-coating portions 111c of a plurality of electrode assemblies 110 to integrally connect the first electrode non-coating portions 111c of the plurality of electrode assemblies 110 to each other. For example, the first plate 221 may have a substantially same shape as that of the first collector plate 120 described previously with reference to FIG. 1A-1D.

As illustrated in FIG. 3, the second plate 222 may cross-connect to the first plate 221, and may contact the respective first electrode non-coating portions 111c. For example, the second plate 222 may be formed on each top surface of a respective electrode assembly 110 to cross the first plate 221. For example, as illustrated in FIG. 3, a secondary battery may include one first plate 221 continuously extending along a first direction on, e.g., directly on, the top surfaces of the first through third electrode assemblies 110a through 110c. As further illustrated in FIG. 3, the secondary battery may include three discrete second plates 222 extending along a second direction, i.e., a direction substantially perpendicular to the first direction, on respective top surfaces of the first through third electrode assemblies 110a through 110c.

In other words, the first plate 221 and the second plate 222 may cross each other to form a cross shape on, e.g., each of, the respective first electrode non-coating portions 111c of a first electrode assembly 110a, a second electrode assembly 110b, and a third electrode assembly 110c. Thus, a contact area between the first collector plate 220 and the first electrode non-coating portions 111c may increase to widen a current flow path between the plurality of electrode assemblies 110 and an external electric device.

Figure 4A:
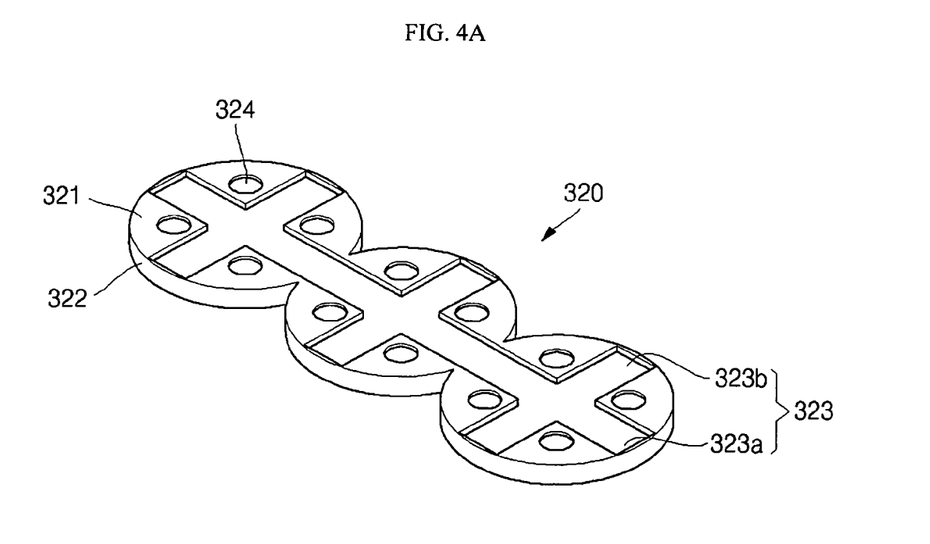
FIG. 4A illustrates a perspective view of a first collector plate of a secondary battery according to another embodiment.
Figure 4B:
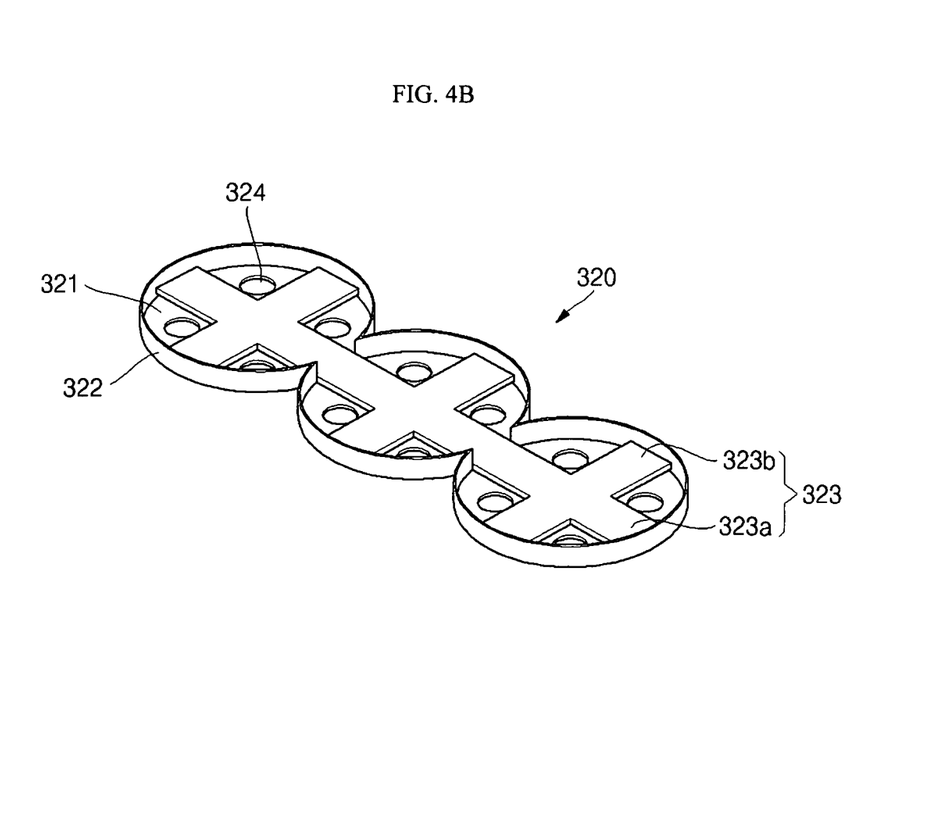
FIG. 4B illustrates a perspective view of an upturned bottom surface of the first collector plate of FIG. 4A.
Figure 5:
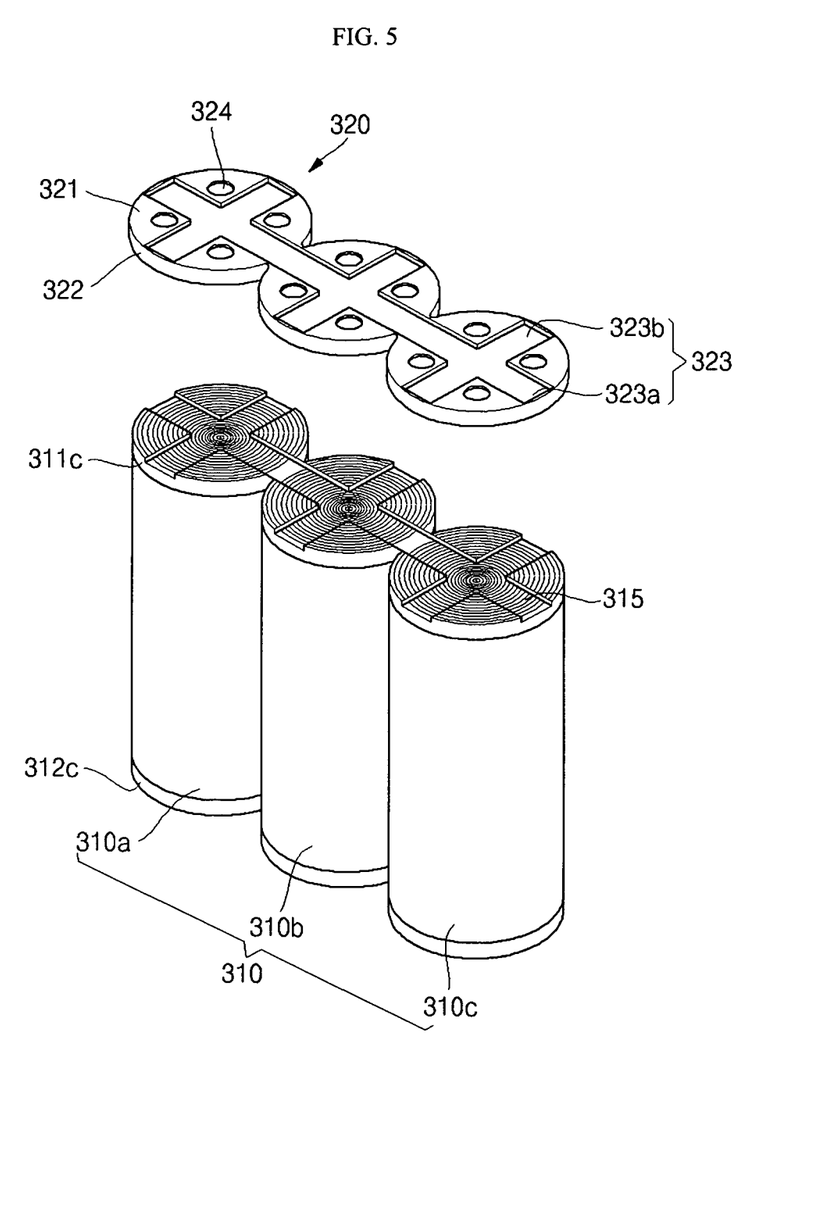
FIG. 5 illustrates a perspective exploded view of the first collector plate of FIG. 4A on a plurality of electrode assemblies.

A secondary battery according to another embodiment will be described below with reference to FIGS. 4A, 4B, and 5. FIG. 4A illustrates a perspective view of a first collector plate of a secondary battery according to another embodiment, FIG. 4B illustrates a perspective view of an upturned bottom surface of the first collector plate of FIG. 4A. FIG. 5 illustrates a perspective view of a state before the first collector plate of FIG. 4A is coupled to a plurality of electrode assemblies. It is noted that the configuration and operation of the secondary battery in FIGS. 4A, 4B, and 5 is substantially the same as that of the secondary battery 100 discussed previously with reference to FIGS. 1A-1D, with the exception of a first collector plate 320 and a plurality of electrode assemblies 310 including a receiving portion 315. Thus, duplicate descriptions will not be repeated.

Referring to FIGS. 4A to 5, the first collector plate 320 may surround, e.g., completely surround, first electrode non-coating portions 311c of the plurality of electrode assemblies 310. Also, the first collector plate 320 may provide a wide current flow path between the plurality of electrode assemblies 310 and the first electrode terminal 142 (FIG. 1B). The first collector plate 320 may include a first base 321, a first sidewall 322, a first welding portion 323, and an electrolyte through hole 324.

The first base 321 may include connected plates having cross-sections corresponding to cross-sections of top surfaces of the electrodes assemblies, e.g., circular plates illustrated in FIG. 4A. As illustrated in FIG. 5, the connected circular plates of the first base 321 may face the first electrode non-coating portions 311c of a first electrode assembly 310a, a second electrode assembly 310b, and a third electrode assembly 310c.

As illustrated in FIG. 5, the first sidewall 322 may extend from the first base 321, e.g., from a point on a perimeter of the first base 321, toward the plurality of electrode assemblies 310, e.g., in a plane perpendicular to a plane of the first base 321 as illustrated in FIG. 4B. The first sidewall 322 may surround, e.g., completely surround, the first base 321, and may surround lateral portions of the first electrode non-coating portions 311c of the plurality of electrode assemblies 310 when coupled to the electrode assemblies 110.

The first welding portion 323 may be disposed in the first base 321, and may protrude toward the plurality of electrode assemblies 310. In other words, as illustrated in FIG. 4B, the first welding portion 323 and the first sidewall 322 may protrude from the first base 321 in a same direction. When the first collector plate 320 is coupled to the plurality of electrode assemblies 310, the first welding portion 323 may surface-contact the first electrode non-coating portions 311c. The first welding portion 323 may provide a welding space in which the first collector plate 320 is welded to the first electrode non-coating portions 311 of the plurality of electrode assemblies 310 using a welding process. The first collector plate 320 may be injection-molded, or the first base 321 may be separately pressed to form the first welding portion 323. Specifically, the first welding portion 323 may include a first protrusion 323a and a second protrusion 323b.

The first protrusion 323a may have a shape substantially the same as that of the first plate 120 described previously with reference to FIGS. 1A-1D, and may contact the first electrode non-coating portions 311c of the plurality of electrode assemblies 310 to integrally connect the first electrode non-coating portions 311c to each other. For example, the first protrusion 323a may have a long rectangular shape in plan view.

The second protrusion 323b may be cross-connected to the first protrusion 323a and may contact respective first electrode non-coating portions 311c. For example, the relative configuration of the first and second protrusions 323a and 323b may correspond to that of the first and second plates 221 and 222 described previously with reference to FIG. 3.

The first electrolyte through hole 324 may be formed through the first base 321. The first electrolyte through hole 324 may be defined around the first welding portion 323 of the first base 321, e.g., at each corner defined by the first and second protrusions 323a and 323b, to provide a path through which electrolyte is injected into the plurality of electrode assemblies 310 when the electrolyte is injected into the case 130.

As illustrated in FIG. 5, the first welding portion 323 may be received, i.e., may fit, into the receiving portion 315 in the first electrode non-coating portions 311c of the plurality of electrode assemblies 310 to couple the first collector plate 320 to the plurality of electrode assemblies 310. The shape of the first and second protrusions 323a and 323b may correspond to the shape of the first collector plate 220 described previously with reference to FIG. 3.

In detail, a portion of the first electrode non-coating portions 311c disposed inside a portion cut by a cutting device (not shown) may be pressed by a pressing device (not shown) to form the receiving portion 315 in a groove shape in an upper portion of the respective first electrode non-coating portions 311c. For example, a single receiving portion 315 may be formed to overlap all the top surfaces of the non-coating portions 311c. For example, the cut portion of the respective first electrode non-coating portions 311c may correspond to an outer perimeter line of the first welding portion 323 as viewed in plane view. The receiving portion 315 may receive the first welding portion 323 having a shape protruding toward the plurality of electrode assemblies 310, e.g., the first welding portion 323 may extend to a predetermined depth into the electrode assemblies 310 to completely fill the receiving portion 315, when the first collector plate 320 is coupled to the plurality of electrode assemblies 310. Thus, the receiving portion 315 may allow the first collector plate 320 to be smoothly coupled to the plurality of electrode assemblies 310. Also, since the first electrode non-coating portions 311c disposed in the receiving portion 315 are pressed by the pressing device, a surface contact area between the first welding portion 323 and the first electrode non-coating portions 311c may increase to easily weld the first welding portion 323 to the first electrode non-coating portions 311c.

As described above, since the secondary battery in FIG. 5 includes the first collector plate 320 configured to, e.g., completely, surround the first electrode non-coating portions 311c of the plurality of electrode assemblies 310, the current flow path between the plurality of electrode assemblies 310 and an external electric device may be widened. Thus, a current flow between the plurality of electrode assemblies 310 and the external electric device may increase.

Also, since the secondary battery includes the plurality of electrode assemblies 310 with the receiving portion 315, the first welding portion 323 protruding toward the plurality of electrode assemblies 310 may be smoothly inserted into the receiving portion 315 of the respective electrode assemblies 310. Thus, the plurality of electrode assemblies 310 may be easily coupled to the first collector plate 320.

Figure 6:
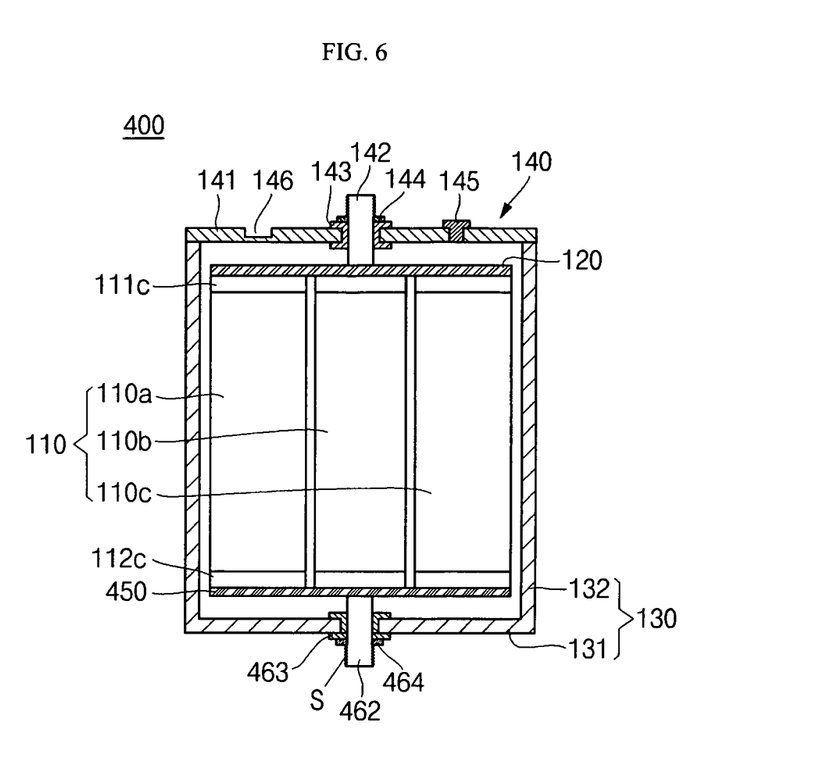
FIG. 6 illustrates a cross-sectional view of a secondary battery according to another embodiment.

A secondary battery 400 according to another embodiment will be described below with reference to FIG. 6. FIG. 6 illustrates a cross-sectional view of a secondary battery according to another embodiment. The secondary battery 400 may have the same configuration and operation as the secondary battery 100 described previously with reference to FIGS. 1A-1D, with the exception of further including a second collector plate 450. Thus, duplicate descriptions will not be repeated.

Referring to FIG. 6, the secondary battery 400 may include the plurality of electrode assemblies 110, the first collector plate 120, the case 130, the cap assembly 140, and the second collector plate 450. Also, the secondary battery 400 may include a second electrode terminal 462, a second gasket 463, and a second nut 464.

The second collector plate 450 may be formed of a conductive material, and may contact the second electrode non-coating portions 112c protruding from the other end of the plurality of electrode assemblies 110. Therefore, the second collector plate 450 may connect, i.e., electrically, in parallel the second electrode non-coating portions 112c of the plurality of electrode assemblies 110 to each other. The second collector plate 450 may be electrically connected to the second electrode plate 112 and the second electrode terminal 462 to provide a current flow path between the plurality of electrode assemblies 110 and an external electric device.

The second collector plate 450 may have the same configuration as the first collector plate 120 of FIG. 1D, the first collector plate 220 of FIG. 3, or the first collector plate 320 of FIG. 4A. Also, the second collector plate 450 may be directly welded to the second electrode non-coating portions 112c of the plurality of electrode assemblies 110.

The second electrode terminal 462 may pass through the bottom portion 131 of the case 130 and may be connected to the second collector plate 450. For example, the second electrode terminal 462 may be welded to the second collector plate 450 using a welding process. Also, the second electrode terminal 462 may be disposed in a central region of the bottom portion 131. The first and second electrode terminals 142 and 462 may be collinearly disposed, e.g., overlap a same electrode assembly 110, in a direction substantially perpendicular to an arrangement direction, i.e., a direction substantially parallel to a line connecting the plurality of electrode assemblies 110, of the plurality of the electrode assemblies 110. In this case, position determination may be easy when the secondary battery is coupled to the external electric device.

The second gasket 463 may be disposed between the second electrode terminal 462 and the bottom portion 131 to insulate the second electrode terminal 462 from the bottom portion 131. For example, an inner surface of the case 130 may be insulated to prevent it from being unnecessarily electrically short-circuited. The second nut 464 may be coupled along the screw thread S disposed on the second electrode terminal 462 to fix the second electrode terminal 462 to the bottom portion 131.

As described above, since the secondary battery 400 includes the second collector plate 450, a current flow between the first collector plate 120, as well as the plurality of electrode assemblies 110, and an external electric device may increase.

Figure 7:
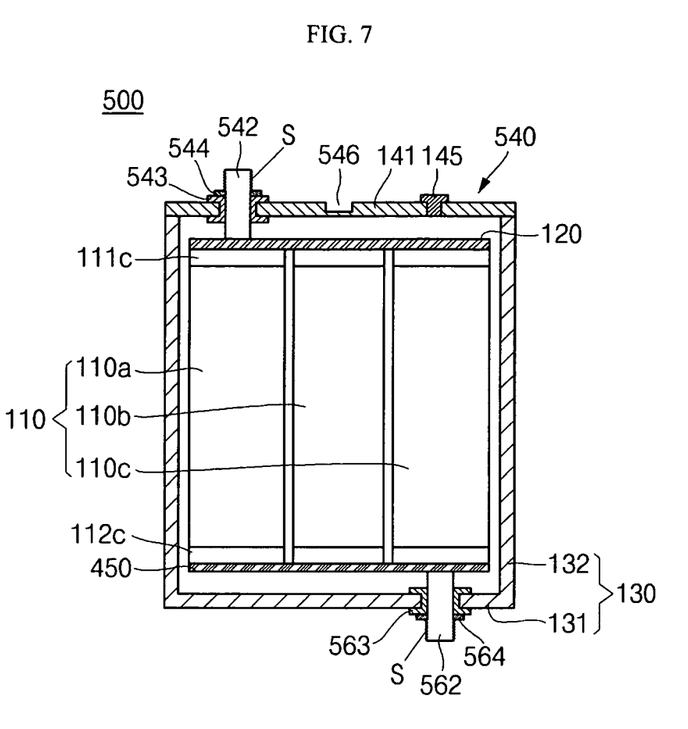
FIG. 7 illustrates a cross-sectional view of a secondary battery according to another embodiment.

A secondary battery 500 according to another embodiment will be described below with reference to FIG. 7. FIG. 7 illustrates a cross-sectional view of a secondary battery according to another embodiment. The secondary battery 500 may have the same configuration and operation as the secondary battery 400 of FIG. 6, except positions of a first electrode terminal 542 and a second electrode terminal 562. Thus, duplicate descriptions will not be repeated.

Referring to FIG. 7, the secondary battery 500 may include the plurality of electrode assemblies 110, the first collector plate 120, the case 130, a cap assembly 540, and the second collector plate 450. Also, the secondary battery 500 may include a second electrode terminal 562, a second gasket 563, and a second nut 564.

The cap assembly 540 may include the cap plate 141, a first electrode terminal 542, a first gasket 543, a first nut 544, a plug 145, and a safety vent 546. The cap assembly 540 is similar to the cap assembly 440 of FIG. 6. However, positions of the first electrode terminal 542, the first gasket 543, the first nut 544, and a safety vent 546 are different from those of the first electrode terminal 142, the first gasket 143, the first nut 144, and the safety vent 146 of the cap assembly 140 of FIG. 6.

The first electrode terminal 542 may be disposed on one side of the first collector plate 120. For example, the first electrode terminal 542 may be disposed over a first electrode assembly 110a.

Since the first gasket 543 and the first nut 544 are coupled to the first electrode terminal 542, positions of the first gasket 543 and the first nut 544 may be changed according to a position of the first electrode terminal 542. Since the first electrode terminal 542 is disposed on the one side of the first collector plate 120, the safety vent 546 may be disposed in a central region of the first collector plate 120.

The second electrode terminal 562 may be disposed on one side of the second collector plate 450. For example, the second electrode terminal 562 may be disposed below a third electrode assembly 110c. The second electrode terminal 562 and the first electrode terminal 542 may be symmetrically disposed about a center of the plurality of electrode assemblies 110, i.e., a center of a second electrode assembly 110b in an arrangement direction of the plurality of electrode assemblies 110. For example, the second electrode terminal 562 and the first electrode terminal 542 may be disposed on opposite sides of the case 130, e.g., to overlap different electrodes assemblies 110, such that a line connecting the first and second electrode terminals 542 and 562 may have a diagonal orientation with respect to the case 130. Thus, when the secondary battery 500 is connected to an external electric device, a charge/discharge path through the first electrode assembly 110a, a charge/discharge path through the second electrode assembly 110b, and a charge/discharge path through the third electrode assembly 110c may have the same length as each other between the first electrode terminal 542 and the second electrode terminal 562. Thus, an amount of heat generated during charge and discharge through each of the first electrode assembly 110a, the second electrode assembly 110b, and the third electrode assembly 110c may be minimized to reduce degradation of each of the first electrode assembly 110a, the second electrode assembly 110b, and the third electrode assembly 110c. Therefore, a life cycle of the secondary battery 500 may be increased.

According to embodiments, although a plurality of prismatic electrode assemblies 210 is described with reference to FIG. 2, the prismatic electrode assemblies may be implemented in other embodiments. For example, the prismatic electrode assemblies may be applicable to the embodiments described with reference to FIGS. 3 to 7.

As described above, a secondary battery with large capacity according to embodiments may include a plurality of small-capacity electrode assemblies and a collector plate electrically connecting the electrode assemblies to each other, so manufacturing equipment for the existing small-capacity secondary battery may be maintained without changes to realize the large-capacity secondary battery. Thus, in the secondary battery according to the embodiments, it may be possible to improve and reduce the completed process and costs.

Also, in the secondary battery according to the embodiments, when external force is applied to the plurality of small-capacity electrode assemblies, only one electrode assembly of the plurality of electrode assemblies may be damaged. Thus, the amount of generated heat may decrease, as compared to that when external force is applied to one large-capacity electrode assembly. Therefore, in the secondary battery according to the embodiments, an explosion potential may be reduced, and safety may be improved.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
    a plurality of electrode assemblies disposed in a same direction, each electrode assembly of the plurality of electrode assemblies including a first electrode plate with a first electrode non-coating portion, a second electrode plate with a second electrode non-coating portion, and a separator between the first electrode plate and the second electrode plate;
    a first collector plate contacting the first electrode non-coating portions of the plurality of electrode assemblies, the first collector plate electrically connecting the first electrode non-coating portions to each other in a parallel connection; and
    a case configured to contain the plurality of electrode assemblies and the first collector plate,
    wherein the first collector plate includes:
        a first welding portion protruding from a base portion toward the plurality of electrode assemblies, the base portion having a plate facing each of the first electrode non-coating portions of the plurality of electrode assemblies, and the first welding portion overlapping the plate of each of the first electrode non-coating portion, and
        a first sidewall extending from an edge of the base portion toward the plurality of electrode assemblies to surround the first electrode non-coating portions of the plurality of electrode assemblies.

2. The secondary battery as claimed in claim 1, wherein the first electrode non-coating portions protrude to a first side of the plurality of electrode assemblies, and the second electrode non-coating portions protrude to a second side opposite the first side of the plurality of electrode assemblies.

3. The secondary battery as claimed in claim 1, wherein the electrode assemblies are disposed adjacent to each other.

4. The secondary battery as claimed in claim 1, wherein the first collector plate includes a plate integrally connecting the first electrode non-coating portions to each other.

5. The secondary battery as claimed in claim 4, wherein the first collector plate has a stripe shape overlapping all the electrode assemblies in the plurality of electrode assemblies.

6. The secondary battery as claimed in claim 1, wherein the first collector plate includes:
    a first plate integrally connecting the first electrode non-coating portions to each other; and
    a second plate cross-connected to the first plate, the second plate contacting respective first electrode non-coating portions.

7. The secondary battery as claimed in claim 6, wherein the first plate and the second plate are cross-connected to each other to form a cross shape on each first electrode non-coating portion.

8. The secondary battery as claimed in claim 1, wherein the first welding portion includes:
   a first protrusion contacting the first electrode non-coating portions of the plurality of electrode assemblies to integrally connect the first electrode non-coating portions of the plurality of electrode assemblies to each other; and
   a second protrusion cross-connected to the first protrusion, the second protrusion contacting each of the respective first electrode non-coating portions.

9. The secondary battery as claimed in claim 1, wherein the plurality of electrode assemblies includes a receiving portion in the first electrode non- coating portions, the receiving portion having a groove shape corresponding to the first welding portion.

10. The secondary battery as claimed in claim 1, further comprising a cap assembly facing the first collector plate and configured to seal the case, the cap assembly including a first electrode terminal exposed to the outside of the cap assembly and connected to the first electrode terminal plate.

11. The secondary battery as claimed in claim 10, further comprising a second collector plate contacting the second electrode non-coating portions of the plurality of electrode assemblies, the second collector plate electrically connecting the second electrode non-coating portions to each other in a parallel connection.

12. The secondary battery as claimed in claim 11, further comprising a second electrode terminal passing through a bottom of the case facing the second collector plate, the second electrode terminal being welded to the second collector plate.

13. The secondary battery as claimed in claim 12, wherein:
   the first electrode terminal is disposed in a central region of the first collector plate, and the second electrode terminal is disposed in a central region of the second collector plate, and
   the first electrode terminal and the second electrode terminal are collinearly disposed in a direction perpendicular to an arrangement direction of the plurality of electrode assemblies.

14. The secondary battery as claimed in claim 12, wherein:
   the first electrode terminal is disposed at a side region of the first collector plate, and the second electrode terminal is disposed at a side region of the second collector plate, and
   the first electrode terminal and the second electrode terminal are symmetrically disposed about a center of the plurality of electrode assemblies in the arrangement direction of the plurality of electrode assemblies.

15. The secondary battery as claimed in claim 1, wherein the second electrode non-coating portions of the plurality of electrode assemblies are welded to the case.

16. The secondary battery as claimed in claim 1, wherein:
   the first electrode plate, the separator, and the second electrode plate are wound to define the electrode assembly, and
   the electrode assembly has a cylindrical shape or a prismatic shape.

17. A secondary battery, comprising:
   a plurality of electrode assemblies disposed in one direction, the plurality of electrode assemblies including first electrode non-coating portions protruding toward one side and second electrode non-coating portions protruding toward another side;
   a first collector plate directly contacting only terminal edges of the first electrode non- coating portions of the plurality of electrode assemblies, the terminal edges facing the one side, and the first collector plate electrically connecting the first electrode non-coating portions to each other in a parallel connection; and
   a case configured to receive the first collector plate and the plurality of electrode assemblies.

18. A method of forming a secondary battery, the method comprising:
   forming a plurality of electrode assemblies disposed in one direction, the plurality of electrode assemblies including first electrode non-coating portions protruding toward one side and second electrode non-coating portions protruding toward another side;
   forming a first collector plate directly welded only to terminal edges of the first electrode non-coating portions of the plurality of electrode assemblies, the terminal edges facing the one side, and the first collector plate electrically connecting the first electrode non-coating portions to each other in a parallel connection; and
   forming a case configured to receive the first collector plate and the plurality of electrode assemblies.

* * * * *